Figure 1:
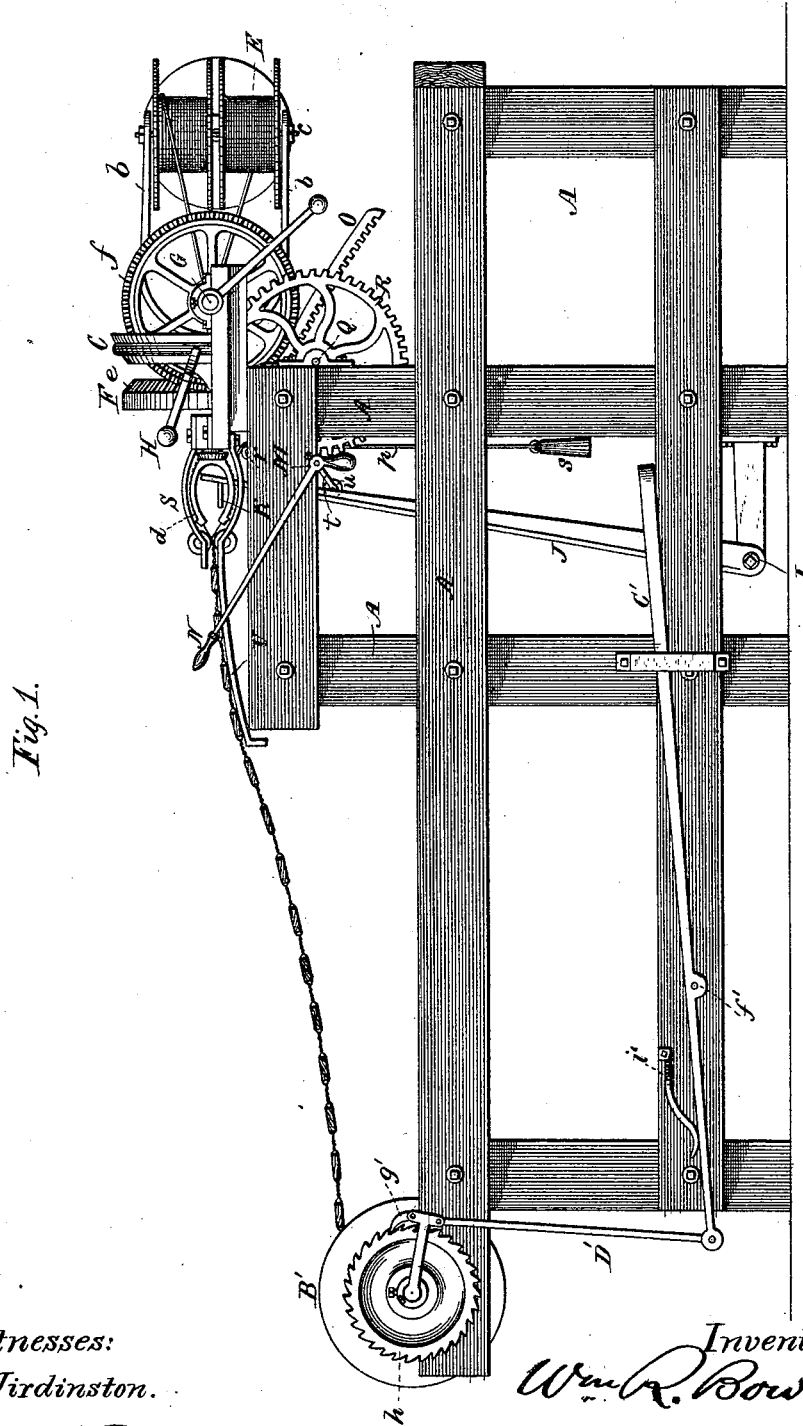

(No Model.) 5 Sheets—Sheet 1.

W. R. BOWDLE.
MACHINE FOR MAKING WIRE AND PICKET FENCING.

No. 346,260. Patented July 27, 1886.

Witnesses:
W. C. Jirdinston.
E. W. Rector

Inventor:
Wm. R. Bowdle
by Steuart Beck
his Attorneys.

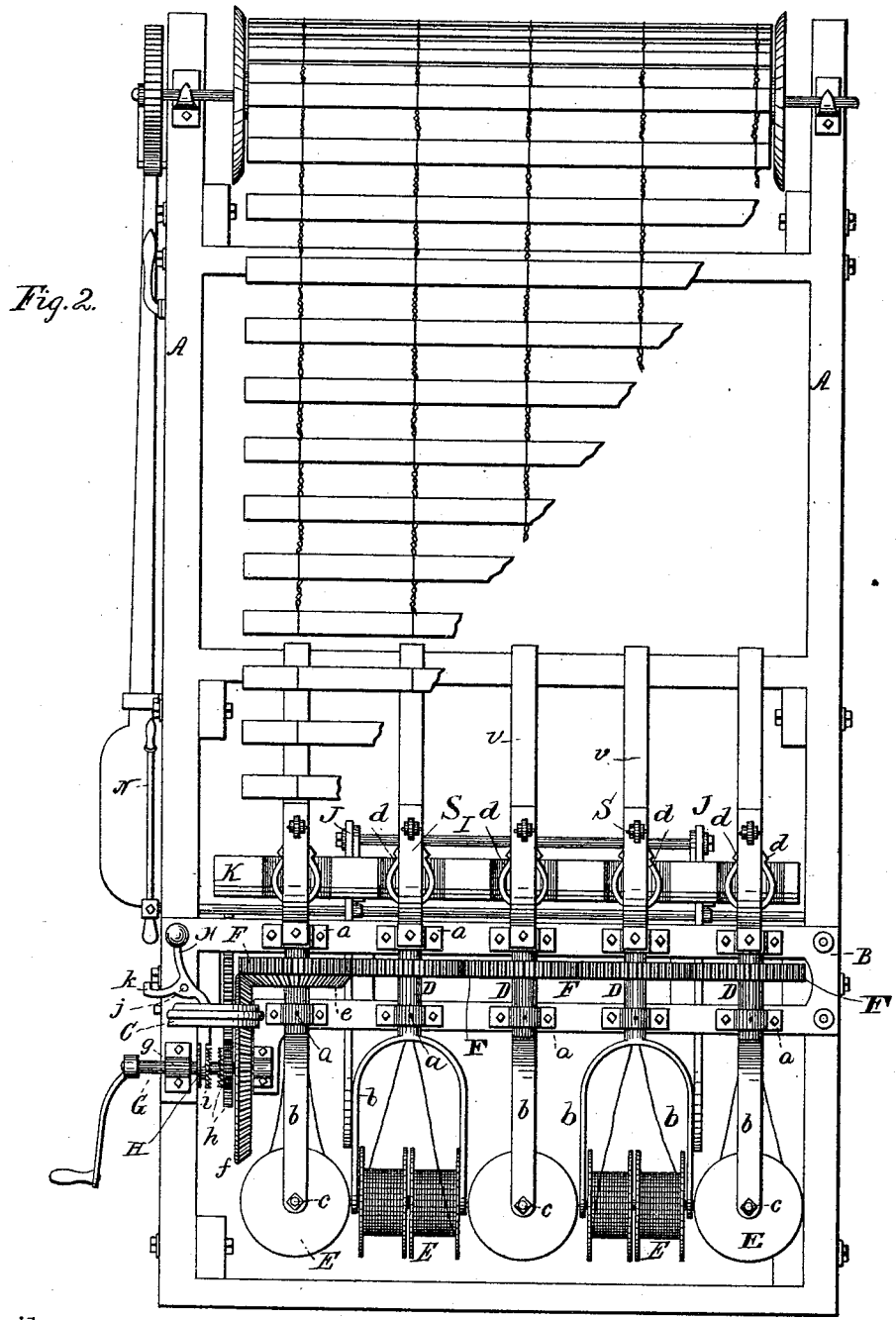

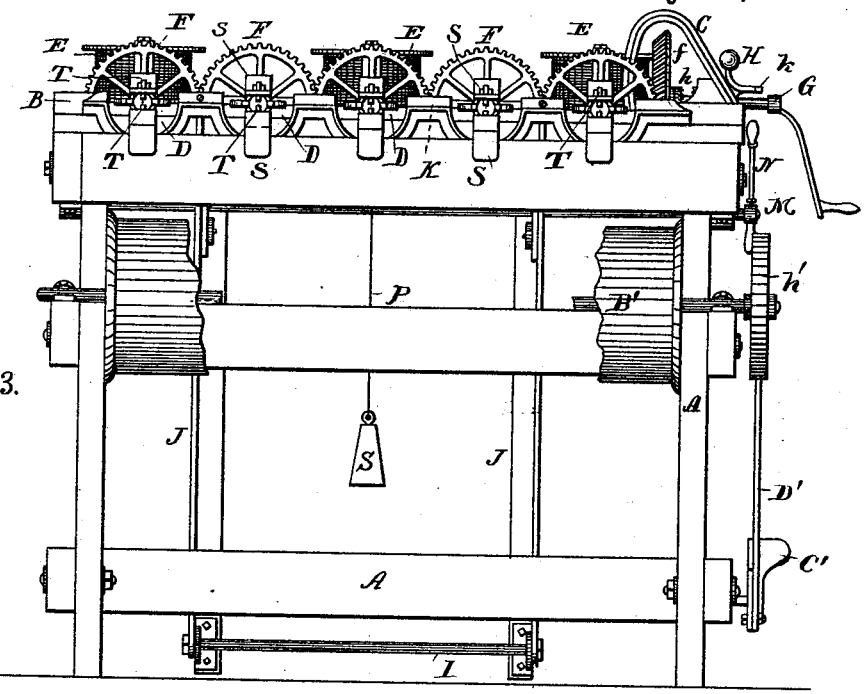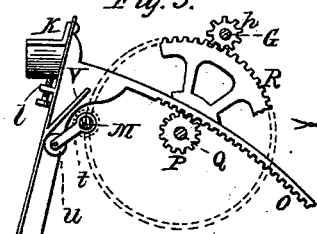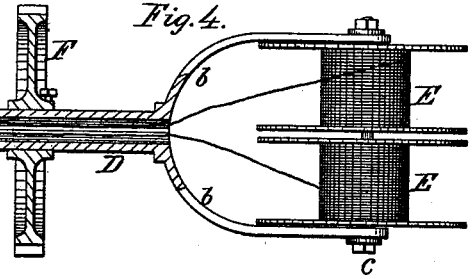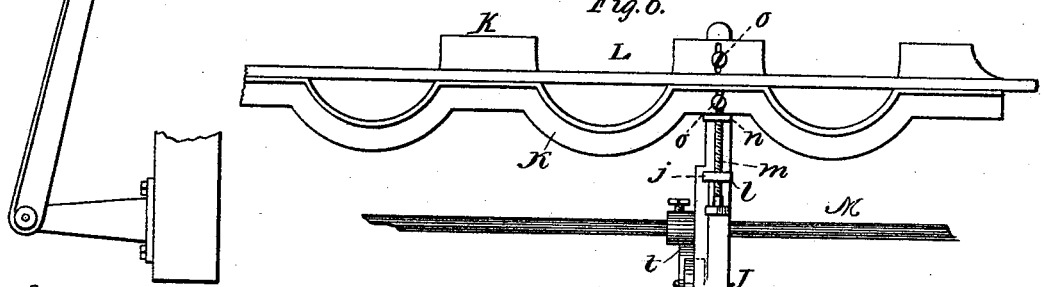

(No Model.) 5 Sheets—Sheet 4.
W. R. BOWDLE.
MACHINE FOR MAKING WIRE AND PICKET FENCING.
No. 346,260. Patented July 27, 1886.
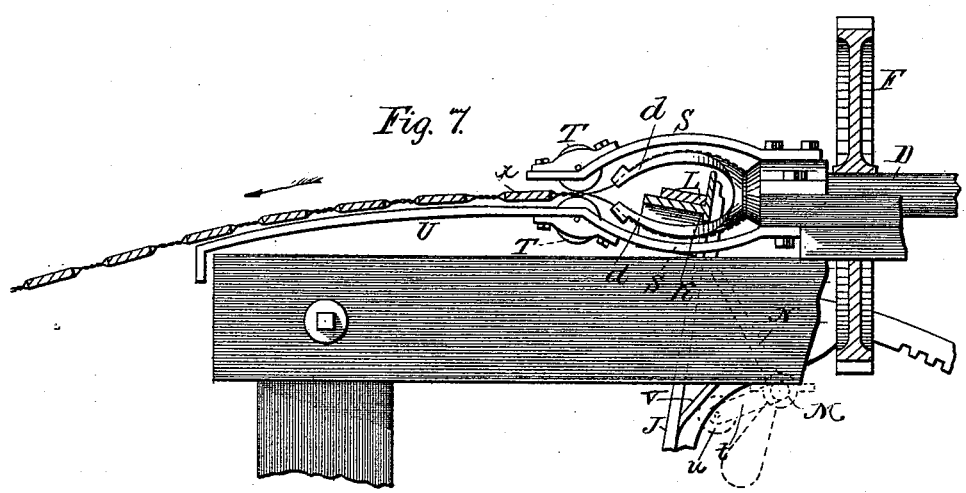
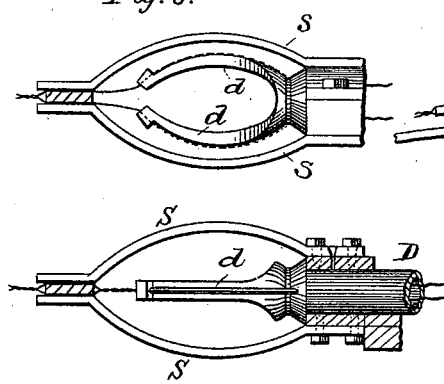
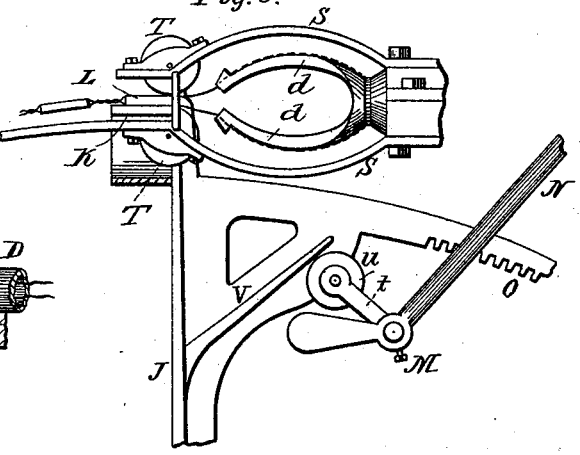
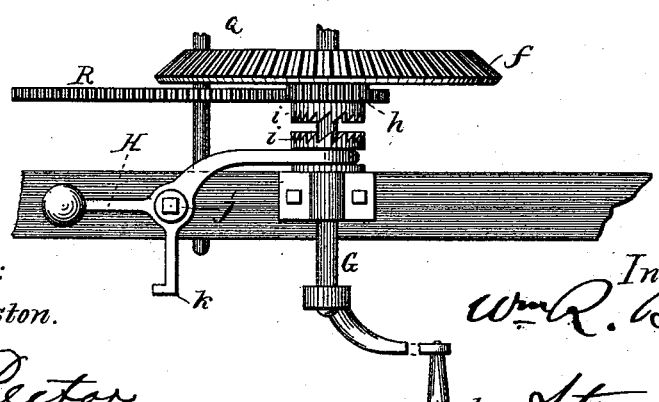
Witnesses:
W. C. Jirdinston.
E. W. Rector.
Inventor:
Wm R. Bowdle
by Stem Beck
Attorneys.

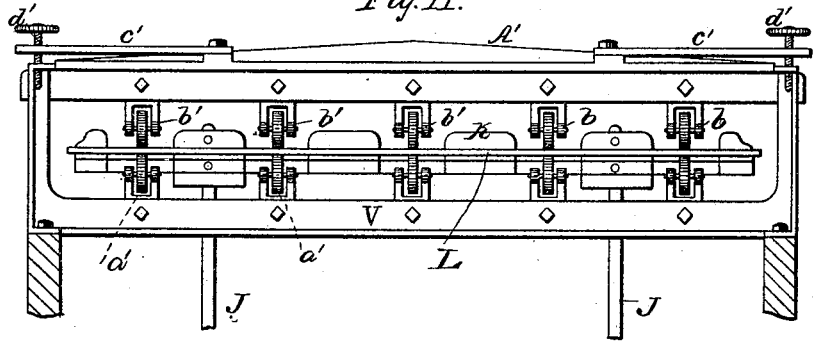
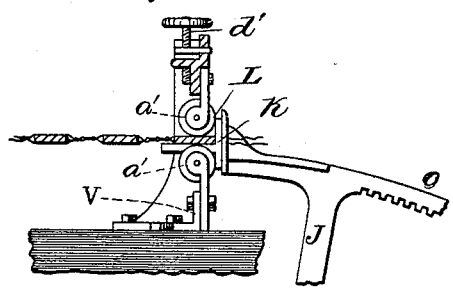
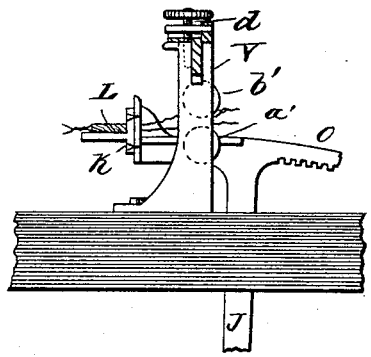
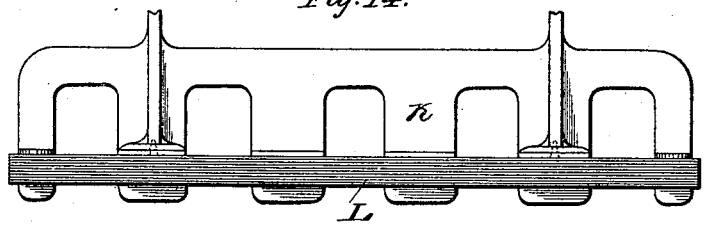
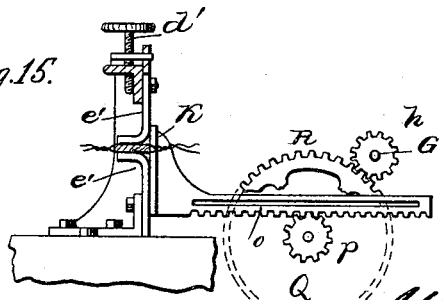

United States Patent Office.

WILLIAM R. BOWDLE, OF PIQUA, OHIO.

MACHINE FOR MAKING WIRE AND PICKET FENCING.

SPECIFICATION forming part of Letters Patent No. 346,260, dated July 27, 1886.

Application filed March 7, 1885. Serial No. 158,045. (No model.)

*To all whom it may concern:*

Be it known that I, WILLIAM R. BOWDLE, a citizen of the United States, residing at Piqua, in the county of Miami and State of Ohio, have invented certain new and useful Improvements in Machines for Making Wire and Picket Fences, of which the following is a full, clear, and exact description, reference being had to the accompanying drawings, forming part of this specification.

My invention relates to that class of fence-making machines in which the wooden slats or pickets are successively fed in between rows of double strands of wire, which are then simultaneously twisted, so as to lock the slats securely in position between them and to form a continuous wire connected fence.

It has for its object the general improvement and simplification of this class of machines, whereby their efficiency is increased and a more durable fence produced.

The novelty of my invention will be herein set forth, and distinctly pointed out in the claims.

In the accompanying drawings, Figure 1 is a side elevation of my improved machine. Fig. 2 is a plan view of the same, with a portion of the fencing broken away to show the operating parts. Fig. 3 is an end elevation of the machine from the rear, with the central portion of the winding drum or reel broken away. Fig. 4 is an enlarged, partially sectional, view of one of the spool-arms, spindle, driving-gear, and twisting-arms. Fig. 5 is an enlarged detailed view of the feed-table and its actuating mechanism. Fig. 6 is a front elevation of a portion of the feed-table enlarged. Fig. 7 is a detailed side elevation illustrating the manner of feeding in the slats. Figs. 8, 9, 10, 11, 12, 13, 14, and 15 are detailed views of parts and modifications to be referred to more particularly hereinafter.

The same letters of reference are used to indicate identical parts in all the figures.

I employ any suitable frame-work, A, (shown in Figs. 1, 2, and 3,) which serves as a support for the journals and bearings of the operating mechanism, and which frame may be of the form and construction indicated. In addition to this main frame-work, I employ a second metallic spindle-bearing frame, B, consisting of two parallel bars with right-angular extensions at one side connected by an arch, C, and bolted to the frame A, as shown. Between the bars of this frame are journaled by suitable boxes, $a$, as many spindles D as there are double strands of wire, which spindles lie horizontally in the longitudinal direction of the frame-work, and are at such distance apart as it is desired to have the rows of connecting-wires on the fence. Each of these spindles has at its rear end a pair of arms, $b$, forming jaws, between which are pivoted, by means of a suitable spindle, $c$, the wire-carrying spools E, of which there are two for each spindle, the wires from which pass through the spindles, made hollow for that purpose, and thence through the curved twisting-jaws $d$, which may be of the shape shown, which are either secured upon or formed integral with the front ends of the spindles. These jaws, as seen in Fig. 8, have longitudinal grooves on their outer sides to receive the wire, and have preferably perforated or slotted heads at their extremities to prevent the slipping of the wire out of the grooves during the operation of twisting. Each spindle has keyed or otherwise fastened to it between the bars of the frame B a gear-wheel, F, and all of the said wheels which are of equal diameter mesh to form a train of gearing, as shown. The end wheel nearest the right-angular extension of the frame B is also formed with a beveled gear, $e$, which meshes with a driving beveled wheel, $f$, keyed upon a crank-shaft, G, journaled in boxes $g$, as shown. Next to the wheel $f$ is loosely journaled a small pinion, $h$, to which is secured one part of a ratchet-clutch, $i$. The other part of this ratchet-clutch is secured by a feather to the shaft G, so as to revolve therewith, but free to be slipped into and out of engagement with the part of the clutch secured to the pinion $h$. The sliding portion of the clutch is provided with an annular groove to receive the jaws of the rearwardly-projecting arm of a bell-crank, H, which is pivoted at $j$, and has an outwardly-projecting arm provided with a stop-shoulder, $k$.

Suitably hung upon a spindle on the tie-rod I are two upwardly-extending arms or bars, J, to the upper front sides of which is adjustably secured the slat carrying and feeding table K, which may be a casting of the shape shown in Figs. 3 and 6, and with depressions in its rear upper edge of sufficient size to permit it to vibrate out and in past the twisting-jaws without interfering with their revolution, and with the supporting horizontal portion of such height as to hold the slat, when inserted endwise, up centrally between the twisting-jaws when standing vertically, as seen in Fig. 7, where L represents the slat.

Ears $l$ are formed or secured upon the upper front faces of the arms J, through which set-screws $m$ extend up and bear against the under side of lugs $n$, projecting from the table. By means of screws $o$, inserted through vertical slots in the table and into the upper ends of the arms J, the table can be adjusted up or down by loosening said screws $o$ and operating the set-screws $m$, as will be readily understood; or the adjustment of the table can be effected in any other manner desired, such as would suggest itself to a mechanic skilled in the art. A cord, $p$, is secured to the table at or near its middle, and passes back over pulley $r$, Fig. 1, suitably journaled to the frame, and has at its lower end a weight, $s$, by means of which the table is drawn back automatically after each slat has been fed forward and the wires twisted.

Upon the outer end of a shaft, M, is secured a hand lever or wheel, N, so arranged that when it is drawn back it comes in contact with and presses against the projecting arm of the bell-crank H, to cause the engagement of the two portions of the clutch $i$. This shaft M has upon it two arms, $t$, provided at their ends with friction-rollers $u$, which bear against an inclined or curved flange, $v$, upon each of the arms J, in such manner that when the lever N, whose normal position of rest is that shown in Fig. 1, is drawn back the arms $t$ are elevated, and the rollers $u$, bearing against the flanges $v$, cause the arms J, together with the feed-table, to be projected forward to the position indicated in Fig. 9. The lever N is preferably provided with a lower weighted end, as shown, which causes the retraction of the lever to its normal position after it has been operated.

Extending back from the upper ends of the arms J, and integral therewith, if desired, are segment-racks O, which mesh with pinions P upon a shaft, Q, suitably journaled in the frame. This shaft likewise carries a larger wheel, R, which meshes with the pinion $h$, before described as loose upon the shaft G. When the table has been projected to the position shown in Fig. 9, and the lever N has operated the bell-crank H to lock the pinion $h$, through the medium of the clutch, to the shaft G, the rotation of said shaft is imparted, through the pinion $h$ and wheel R, to the pinions P, which, acting upon the segment-racks O, cause the further feeding forward of the table and slat while the wire is being twisted to the position of the slat $x$ in Fig. 7. When the machine is stopped, the lever or bell-crank H is thrown out and the table is retracted by the weight $s$ and a new slat is introduced.

Secured to each of the boxes $a$ upon the front bar of the frame B are curved spring clamping-jaws S, between which the twisting-arms are free to rotate, and which have suitably journaled in slots at their outer ends pressure-rollers T, between which the slats are forced and held firmly and the wire pressed against them and all slack taken up, as seen in Fig. 9, before the final twisting is done. The lower of the arms S are preferably extended, as at U, Fig. 7, to form supports for the slats on their way from the twisting-jaws to the winding-drum. Instead of the rollers T, the jaws may terminate in flat extensions to form clamps, as seen in Fig. 8, the upper portion of which represents the twisting-jaw in a vertical position before the twisting has been accomplished, and the lower portion of which represents it in a horizontal position after the twisting has been done; or, instead of the arms S, with or without the rollers, an upright open frame, V, Figs. 11, 12, and 13, may be employed, which frame would be bolted to the table and have suitably journaled upon its lower bar pressure-rollers $a'$, and an upper corresponding set of pressure-rollers, $b'$, journaled to an upper bar, A', connected by springs $c'$ and set-screws $d'$ to the uprights of the frame V in such manner that the pressure of said rollers could be adjusted at will. Under this modification the feeding-table would be projected somewhat forward from the arms J, as shown in Figs. 12, 13, and 14; or, again, where this latter frame-work is preferred, the pressure-rollers might be dispensed with and legs or bearings $e'$, as seen in Fig. 15, be substituted therefor; or, again, instead of having the feed-table integral or connected, it may be composed of a number of sections, each provided with a rack engaging with a pinion upon the shaft Q, as seen in Fig. 15, and where all the sections would be so adjusted with reference to the driving-pinions as to move forward simultaneously and uniformly to feed the slat.

The fence as it is being made is wound upon a drum or reel, B', at the rear of the table, which drum is actuated by a treadle-lever, C', pivoted at $f'$, and having a link-arm, D', united to a pawl, $g'$, that engages with a ratchet-wheel, $h'$, secured upon the outer end of the drum-shaft. At each operation of the machine by which a slat, after being secured, is advanced, the treadle C' could be actuated to partially revolve the drum B', or it could be left until there was considerable slack in the fencing made, and then the drum could be rotated by successive actions of the treadle C' to wind up the fence.

Any suitable spring, $i'$, may be employed to retract the pawl and reset the pedal, as will be apparent.

Having thus fully described my invention, I claim—

1. In a fence-machine, a series of twister-spindles provided upon their front ends with twisting-jaws and upon their rear ends with spool-carriers, said spindles being connected by a train of gearing located in front of the spool-carriers, and between the journals which unite said spindles to the frame of the machine, substantially as described.

2. In a fence-machine, the combination, with the wire-twisters and a vibrating feed-table, of compression-jaws adapted to receive the slat from the feed-table, and to hold the same while the wire is being twisted, substantially as described.

3. In a fence-machine, the slat receiving and holding jaws, provided with compression-rollers in line with the wires for compressing the same and for securely holding the slat, substantially as described.

4. In a fence-machine, compression-jaws provided with compression-rollers in line with the wires, whereby the wires are compressed upon the slat, and all slack is taken up before the final twisting is done.

5. In a fence-machine, a vibrating slat-feeding table actuated by a hand-lever, for propelling the slat from between the twisting-jaws, and mechanism connecting said table with the main driving-shaft, whereby while the wires are being twisted said table is further advanced by the action of the machine to carry the slat forward sufficiently, and is retracted to permit the introduction of a second slat, substantially as described.

6. In a fence-machine, and in combination with the spindle-driving gearing, the vibrating feed-table, hand-lever N, bell-crank H, clutch $i$, pinion $h$, intermediate pinion, R, and pinions P, meshing with racks attached to the feed-table, substantially as and for the purpose described.

7. The combination, with the vibrating feed-table, of the shaft M, arms $t$, rollers $u$, and hand-lever N, substantially as and for the purpose specified.

8. The combination, with the vibrating arms J, of the feed-table K, connected thereto by screws $o$, and adjustable thereon by means of the set-screws $m$, substantially as described.

WILLIAM R. BOWDLE.

Witnesses:
CHAS. C. BARRETT,
T. D. McCLAY.